United States Patent
Robertson et al.

(10) Patent No.: US 7,346,333 B2
(45) Date of Patent: Mar. 18, 2008

(54) METHOD AND APPARATUS FOR EFFECTUATING A PREDETERMINED COMMUNICATIONS CONNECTION

(75) Inventors: Ryan Robertson, Seattle, WA (US); Stephane Maes, Mountain View, CA (US); Mark Kruger, Seattle, WA (US); Eric Williams, University Place, WA (US)

(73) Assignee: Palm, Inc., Santa Clara, CA (US)

( * ) Notice: Subject to any disclaimer, the term of this patent is extended or adjusted under 35 U.S.C. 154(b) by 582 days.

(21) Appl. No.: 09/844,164

(22) Filed: Apr. 27, 2001

(65) Prior Publication Data
US 2002/0160807 A1    Oct. 31, 2002

(51) Int. Cl.
*H04M 11/04* (2006.01)
(52) U.S. Cl. .................. 455/404.1; 455/575.1
(58) Field of Classification Search ............. 455/404.1, 455/456.1, 404.2, 565, 564, 575.1; 340/34.1
See application file for complete search history.

(56) References Cited

U.S. PATENT DOCUMENTS

| | | | |
|---|---|---|---|
| 4,057,794 A | 11/1977 | Grossfield .................. 340/311 |
| 4,931,789 A * | 6/1990 | Pinnow ..................... 340/5.64 |
| 5,010,547 A | 4/1991 | Johnson et al. |
| 5,012,219 A | 4/1991 | Henry |
| 5,075,684 A | 12/1991 | DeLuca |
| 5,359,317 A | 10/1994 | Gomez et al. |
| 5,394,140 A | 2/1995 | Wong et al. |
| 5,430,436 A | 7/1995 | Fennell |
| 5,467,387 A * | 11/1995 | Kienberger ............ 379/167.12 |
| 5,542,100 A | 7/1996 | Hatakeyama ............. 455/56.1 |
| 5,612,682 A | 3/1997 | DeLuca et al. |
| 5,650,776 A | 7/1997 | Mitchell et al. |
| 5,705,995 A | 1/1998 | Laflin et al. |
| 5,714,931 A * | 2/1998 | Petite et al. ........... 340/539.17 |
| 5,729,203 A | 3/1998 | Oka et al. .................... 340/573 |
| 5,742,666 A | 4/1998 | Alpert ......................... 379/58 |
| 5,777,551 A * | 7/1998 | Hess .......................... 340/541 |
| 5,812,954 A * | 9/1998 | Henriksson ................. 455/566 |
| 5,901,365 A * | 5/1999 | Yasuda et al. .............. 455/564 |
| 5,903,852 A | 5/1999 | Schaupp, Jr. et al. |
| 5,958,006 A | 9/1999 | Eggleston et al. |
| 6,028,915 A * | 2/2000 | McNevin ..................... 379/49 |
| 6,031,470 A * | 2/2000 | Asari et al. .................. 341/22 |
| 6,035,187 A | 3/2000 | Franza ....................... 455/404 |
| 6,052,052 A | 4/2000 | Delmonaco ................. 340/539 |
| 6,157,630 A | 12/2000 | Adler et al. |
| 6,198,914 B1 * | 3/2001 | Saegusa ................... 455/404.2 |

(Continued)

OTHER PUBLICATIONS

U.S. Appl. No. 60/127,028, filed Mar. 31, 1999, Benedict S. Curatolo et al.

(Continued)

*Primary Examiner*—Charles N. Appiah
*Assistant Examiner*—Joy Contee
(74) *Attorney, Agent, or Firm*—Foley & Lardner LLP

(57) ABSTRACT

A handheld computing device includes a housing, a processor supported by the housing, a wireless telephony device coupled to the processor, a display having a graphical user interface coupled to the processor, and a plurality of input keys. The device is programmed to effectuate a predetermined communications connection when a user depresses two or more input keys simultaneously.

22 Claims, 2 Drawing Sheets

U.S. PATENT DOCUMENTS

| | | |
|---|---|---|
| 6,332,073 B1 * | 12/2001 | Nilsson et al. ............ 455/404.1 |
| 6,332,084 B1 * | 12/2001 | Shaanan et al. ............ 455/566 |
| 6,363,732 B1 * | 4/2002 | Bluhm ...................... 62/196.4 |
| 6,449,472 B1 * | 9/2002 | Dixit et al. .............. 455/404.1 |
| 6,510,380 B1 | 1/2003 | Curatolo et al. |
| 6,535,743 B1 * | 3/2003 | Kennedy et al. ......... 455/456.1 |
| 6,636,732 B1 * | 10/2003 | Boling et al. ............ 455/404.1 |
| 6,889,135 B2 | 5/2005 | Curatolo et al. |
| 7,058,385 B2 * | 6/2006 | Lauper ................... 455/404.1 |
| 7,092,695 B1 * | 8/2006 | Boling et al. ............ 455/404.1 |
| 2005/0049011 A1 * | 3/2005 | Ko ............................. 455/572 |
| 2005/0136912 A1 * | 6/2005 | Curatolo et al. ............ 455/423 |

OTHER PUBLICATIONS

Sherridythe A. Fraser et al., Decision on Appeal, Mar. 12, 2007, Appeal 2007-0251, U.S. Appl. No. 10/085,312, Technology Center 2600, pp. 1-8.

* cited by examiner

METHOD AND APPARATUS FOR EFFECTUATING A PREDETERMINED COMMUNICATIONS CONNECTION

BACKGROUND

Handheld computing devices, "palmtops," "palmhelds," personal digital assistants (PDAs), or handheld computers typically weigh less than a pound and fit in a pocket. These handhelds generally provide some combination of personal information management, database functions, word processing, and spreadsheets as well as communications network connectivity, internet connectivity, voice memo recording, and telephony functions. Because of the small size and portability of handhelds, strict adherence to hardware constraints, such as input hardware must be maintained. It is conventional to have buttons or switches on the handheld computer for providing user input to the handheld computer.

Handheld computing devices may include a wireless telephony device permitting the user to make wireless communications such as mobile telephone calls or data downloads or uploads to a computer network. It is conventional to employ a touch pad, touch screen, or handwriting recognition area and/or device to provide input to the handheld computer. If no dialing device such as a keypad is included, the user may use the touch pad, touch screen, or handwriting recognition area to control the wireless telephony device.

The ways in which handheld computers may permit wireless phone calls without the use of a conventional telephone keypad include using the touch screen to select the numbers from those displayed on the screen, using the address book function of the device to choose the desired number to call, and using a voice recognition system.

If the handheld computing device does not include a conventional telephone keypad, the user may encounter difficulty and/or delay making phone calls when the touch screen is not functioning or is updating slowly, and when the operating system is not in the dialer or phone mode. Further, even when the handheld computing device has a classic telephone keypad, the user may encounter difficulties in making a phone call when one or more of the mechanical keys loses functionality.

If the user is having difficulty making a phone call because the touch screen is not functioning well or if the user does not know how or remember how to get to the proper location in the user interface to make a phone call, problems may arise, especially in the case of an emergency when the user desires to make a call to an emergency service such as 911. Accordingly, there is a need for an alternative ability to call an emergency service when conventional methods are unavailable on a handheld computing device. There is also a need for an alternative dialing method and apparatus relating to a handheld computer that enables simplified dialing of specified telephone numbers, such as but not limited to emergency service numbers. Further, there is a need for a handheld computer that includes a computer program configured to automatically dial an emergency service number when a certain combination of user inputs is applied.

The teachings herein below extend to those embodiments that fall within the scope of the appended claims, regardless of whether they accomplish one or more of the above mentioned needs.

SUMMARY

An exemplary embodiment relates to a handheld computing device. The handheld computing device includes a housing and a processor supported by the housing. The handheld computing device also includes a wireless telephony device coupled to the processor, a display having a graphical user interface coupled to the processor, and a plurality of input keys. The device is programmed to effectuate a predetermined communications connection when a user depresses two or more input keys simultaneously.

Another exemplary embodiment relates to a method of making an emergency request. The method includes providing a handheld computing device having wireless communication capability and having two or more user input devices. The method also includes activating two or more user input devices simultaneously, whereby the device effectuates a communications channel to an emergency service.

Yet another exemplary embodiment relates to a method of programming a handheld computer having a hardware abstraction layer, an operating system, and wireless communication capability to call an emergency service in response to user input. The method includes the step of programming the hardware abstraction layer to direct the operating system to dial the emergency service when a user activates a certain combination of input devices simultaneously.

Yet still another exemplary embodiment relates to a handheld computer. The handheld computer includes a processor, a touch screen coupled to the processor, a plurality of user input keys coupled to the processor, a wireless telephony device coupled to the processor, and an operating system running on the processor. The operating system is configured to call an emergency service when two or more user input keys are pressed simultaneously.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
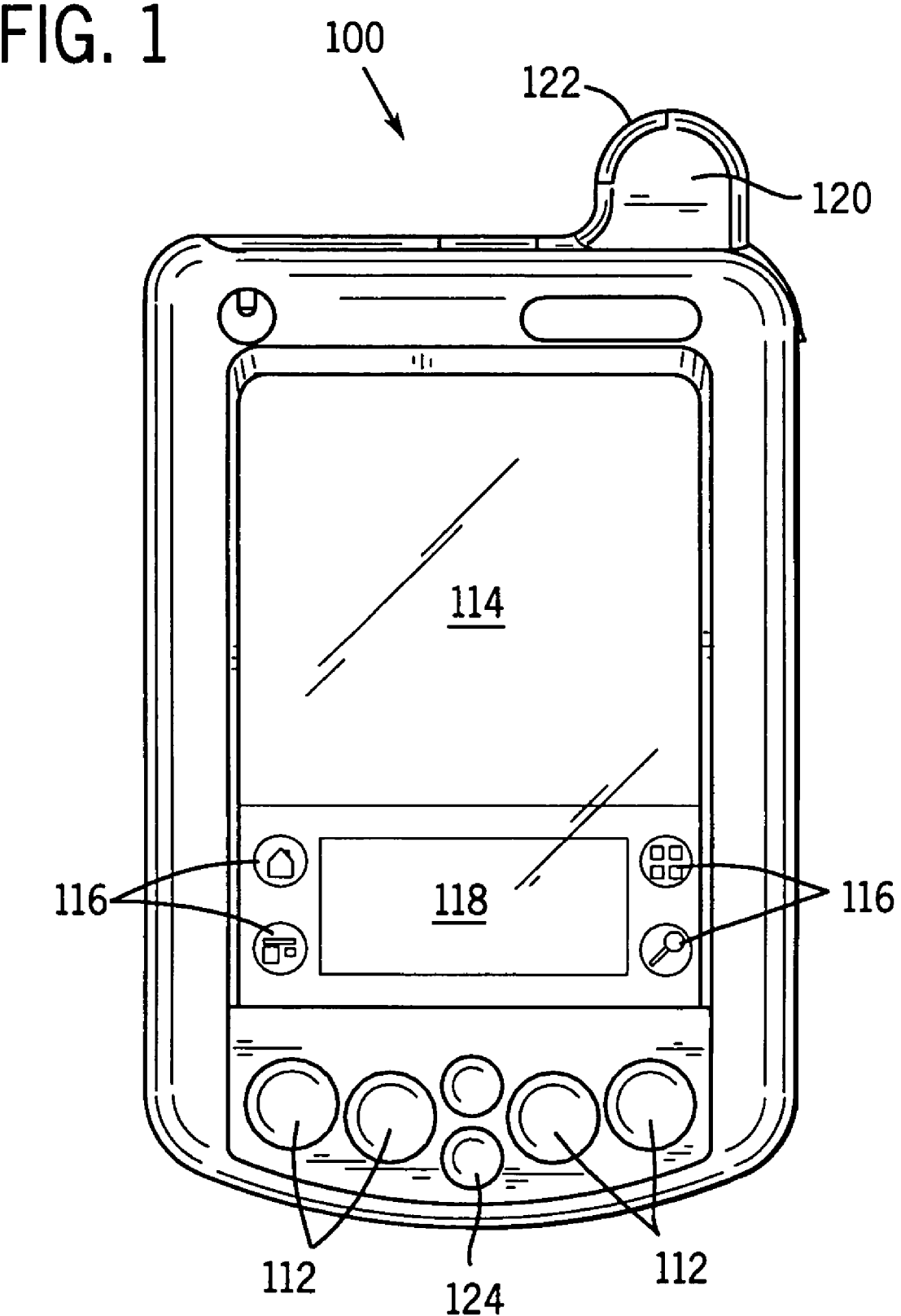
FIG. 1 is an exemplary front elevation view of a handheld computer.

Referring to FIG. 1, a handheld computer 100 is depicted according to an exemplary embodiment. Handheld computer 100 may include Palm style computers manufactured by Palm, Inc., of Santa Clara, Calif. Other exemplary embodiments may include Windows CE handheld computers, or other handheld computers and personal digital assistants, as well as mobile telephones, and other mobile computing devices.

Preferably, handheld computer 100 includes interactive hardware and software that performs functions such as maintaining calendars, phone lists, task lists, note pads, calculator applications, spreadsheets, games, and other applications capable of running on a computing device. Further, handheld computer 100 may be configured for such functions as voice memo recording and playback as well as communications network connectivity, internet connectivity and wireless telephony.

Handheld computer 100, depicted in FIG. 1 includes a plurality of input function keys 112 and a display 114 having graphical user interface features. Display 114 may be provided with a touch screen interface that allows a user to select and alter displayed content using a pointer, such as but not limited to a stylus, a pen tip, a fingertip, or other pointing devices.

Referring again to FIG. 1, in an exemplary embodiment, display 114 also includes a Graffiti™ (or other handwriting recognition software) writing section 118 for tracing alphanumeric characters as input. A plurality of input icons 116 for performing automated or preprogrammed functions maybe be provided on a portion of display 114.

In an exemplary embodiment, handheld computer 100 may include an integrated antenna 120 configured to transmit and receive wireless communication signals, such as, but not limited to, cellular telephone communication signals and other radio frequency (RF) communications signal. Antenna 120 may further include an indicator light 122 integrated into antenna 120 for indicating the transmission and reception of wireless communication signals. Further, light 122 may be used to indicate other states of handheld computer 100.

In an exemplary embodiment, handheld computer 100 also includes navigation buttons 124 that may be utilized for navigating or scrolling of information displayed on display 114. Further, navigation buttons 124 may be programmed for other uses depending on the application running on handheld computer 100.

Handheld computer 100 may be used for any of a variety of wireless communications, including, but not limited to, communications with the World Wide Web, mobile telephone communications, e-mail communications, etc. In an exemplary embodiment, a user may use the wireless communication function by interacting with display 114. Ways in which display 114 can be used include using a stylus to select numbers on a displayed keypad, selecting numbers from an address book, or having preprogrammed numbers programmed into input icons 116.

Figure 2:
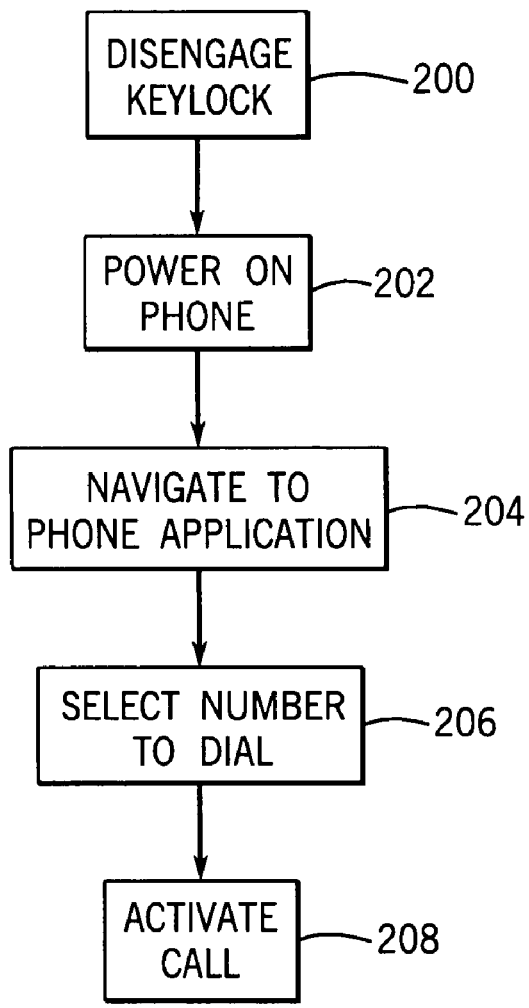
FIG. 2 is an exemplary process diagram depicting a conventional series of steps of making an emergency call using a handheld computing device.

Referring to FIG. 2, a conventional method of placing a telephone call using handheld computer 100 may include the following steps. First the user disengages a key lock if one is so engaged (step 200). Many handheld computers 100 include such a key lock or key guard to prevent operations due to accidental depression of keys or buttons while the device is in storage such as in a pocket, briefcase, or travel bag. Accordingly, such a key lock device must be disengaged prior to utilizing the other features of the handheld computer 100. Second, the user powers on the telephone function of handheld computer 100 (step 202). Typically, powering on the telephone function involves depressing a key for a couple seconds. Once the telephone function is activated, the user must navigate to an application that will permit use of the phone (step 204). Step 204 may involve selecting an icon displayed as part of an applications launcher or selecting an input icon such as input icon 116. Some exemplary applications that can be used to make phone calls on a typical handheld computer 100 include a speed dial application, an address book, a dialer application, or a voice recognition application.

Depending on where the user is in the user interface, navigating to a phone application can involve several separate interactions with display 114. Once the user has selected a phone application, the user must input the number to be dialed (step 206). The process used to select the number to be dialed by the phone depends on the application the user is operating. Examples include selecting a phone number from an address book application after the user has searched for a particular name, tapping numbers on a displayed keypad on display 114 if the user is operating a dialer application, or writing numbers into writing section 118 using a stylus. After the user has selected a number to call, the user must activate the phone call (step 208). Typically, activating the call involves tapping a phone icon displayed on display 114.

There are occasions in which the user may have difficulty navigating back to a dialing application such that a wireless call can be made. For example, in cold weather conditions, the LCD screen can be slow to update, hampering the user's efforts to navigate back to the dialer application, or to select numbers or icons from display 114. In cold conditions, the LCD screen can lose functionality, preventing the user from placing a call using display 114 entirely. LCD touch screen functionality can also be lost when handheld computer 100 is extremely hot.

When display 114 is not functioning effectively, it can be difficult to use a voice dial application as well because the handheld computer 100 may first require the selection of a voice dial icon from an applications launcher prior to permitting the use of the voice dial application.

According to an exemplary embodiment, handheld computer 100 may be programmed to automatically place an emergency call to the mobile phone infrastructure when all four input function keys 112 are depressed simultaneously. Accordingly, the user may place an emergency call even when display 114 is functioning slowly or not functioning at all, by depressing all four input function keys 112 simultaneously.

In a further exemplary embodiment, input function keys 112 must be simultaneously held down for a specified time, such as, but not limited to one second, for example, before handheld computer 100 will place the emergency call. Function keys 112 must be simultaneously depressed for an elongated period, such as one second, so that an emergency call is not inadvertently placed by a user accidentally simultaneously depressing function keys 112. Typically, in the United States, handheld computer 100 will place the emergency call by dialing 9-1-1. In Europe, the handheld computing device can call 1-1-2 to place the emergency call. Alternatively, other communications links may be effectuated by the simultaneous key depression, such as, but not limited to connections over other communications networks (e.g. the internet or public service networks) directly to emergency service providers.

In alternative embodiments of handheld computer 100 where a telephone keypad (not shown) is included with handheld computer 100, handheld computer 100 may still be programmed to place the emergency call when all four input function keys 112 are depressed simultaneously, providing the user with another option to place an emergency call, for example if the keys on the attached telephone keypad are not functioning.

Figure 3:
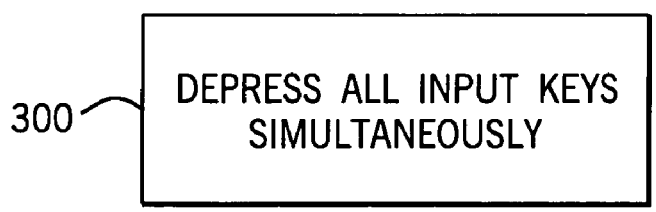
FIG. 3 is an exemplary process diagram depicting the step of making an emergency call of the present specification.

Referring to FIG. 3, a method of placing a call to an emergency service provider is depicted. In an exemplary embodiment, the user depresses all four input function keys 112 simultaneously for one second (step 300). After the user executes step 300, handheld computer 100 will place a call to an emergency service provider regardless of the power state of the phone device, or the location of the user in the user interface.

An exemplary manner of programming handheld computer 100 to place an emergency call when, for example, all four input function keys 112 are depressed, includes modifying the hardware abstraction layer (which underlies the operating system for handheld computer 100) to start the appropriate process when all four input function keys 112 are depressed simultaneously by the user. In an exemplary embodiment, when all four input function keys 112 are depressed simultaneously for one second, handheld computer 100 will automatically place the emergency call or provide a communications connection to an emergency service provider regardless of whether the dialer application is launched. If the phone is turned off when the four input function keys 112 are depressed, handheld computer 100 will turn the phone on and place the emergency call. Thus the user can place an emergency call by depressing the four input function keys 112 simultaneously regardless of where the user currently is in the user interface or whether the phone is turned on or off.

In a further exemplary embodiment, the hardware abstraction layer may be programmed to automatically have the operating system place an emergency call when the user depresses alternative combinations of input function keys 112, for example depressing two or three keys simultaneously for a certain period of time, or even holding one input function key 112 down for a certain length of time. Navigation buttons 124 may also be used as the input to place the emergency call. The use of input function keys 112 and navigation buttons 124 instead of requiring user interaction with display 114 solves the problems discussed in the Background section whereby the user can have difficulty placing a call when display 114 is non-functional or updating slowly. Further, it should be noted that many configurations of handheld computers and other mobile devices exist that may include other types and configurations of input devices, such as, but not limited to different button configurations, scrolling devices, knobs, selectors, switches, temperature activated switches, pressure activated switches, and the like. Alternative embodiments are applicable to these and many other devices and configurations in which a specific input device activation may be used to cause automatic dialing of an emergency call or connection to an emergency service provider. Further still, it should be noted that many methods exist for programming the functionality of an automatic emergency call upon a specified input device activation, not limited to the programming of the hardware abstraction layer as referred to above.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A mobile computing device, comprising:
    a housing;
    a processor supported by the housing;
    a wireless telephony device coupled to the processor;
    a display having a graphical user interface coupled to the processor; and
    a plurality of input keys,
    wherein the device is programmed to effectuate a predetermined communications connection when a user depresses two or more input keys simultaneously and the device effectuates the predetermined communications connection when the wireless telephony device is powered on and when the wireless telephony device is powered off.

2. The mobile computing device of claim 1, wherein the computing device is a handheld computing device.

3. A mobile computing device, comprising:
    a housing;
    a processor supported by the housing;
    a wireless telephony device coupled to the processor;
    a display having a graphical user interface coupled to the processor; and
    a plurality of input keys,
    wherein the device is programmed to effectuate a predetermined communications connection when a user depresses two or more input keys simultaneously and the device effectuates the predetermined communications connection when the state of the software operating on the device is in a non-communications mode and when the state of the software operating on the device is in a communications mode.

4. The mobile computing device of claim 3, wherein the computing device is a handheld computing device.

5. The mobile computing device of claim 3, wherein the device calls an emergency service by dialing 9-1-1.

6. The mobile computing device of claim 3, wherein the device calls an emergency service by dialing 1-1-2.

7. The mobile computing device of claim 3, further comprising:
    a plurality of navigation buttons, wherein the device is programmed to effectuate the predetermined communications connection when a combination of the navigation buttons and the input keys is depressed simultaneously.

8. The mobile computing device of claim 3, wherein the predetermined communications connection is effectuated by dialing a predetermined telephone number.

9. The mobile computing device of claim 3, wherein the predetermined number is the number for an emergency service.

10. The mobile computing device of claim 3, wherein the user must depress and hold the two or more input keys for greater than one second to effectuate the predetermined communications connection.

11. The mobile computing device of claim 3, wherein the user must depress four input keys simultaneously to effectuate the predetermined communications connection.

12. A method of making an emergency request, comprising the steps of:
    providing a computing device having wireless communication capability and having two or more user input devices; and
    activating two or more user input devices simultaneously, whereby the device effectuates a communications channel to an emergency service,
    wherein the device effectuates the communications channel to the emergency service when the state of any software operating on the device is in a non-communications mode and when the state of the software running on the device is in a communications mode.

13. The method of making an emergency request of claim 12, wherein the computing device is a handheld computing device.

14. The method of making an emergency request of claim 8, further comprising the step of:
   activating the two or more input devices for at least one second.

15. The method of making an emergency request of claim 12, wherein the user must activate four input devices simultaneously to effectuate the communications channel to the emergency service.

16. The method of making an emergency request of claim 8, wherein the communications channel is a telephone connection to an emergency service made by dialing 9-1-1.

17. The method of making an emergency request of claim 12, wherein the communications channel is a telephone connection to an emergency service made by dialing 1-1-2.

18. The method of making an emergency request of claim 12, further comprising the steps of:
   providing a plurality of navigation buttons and user input keys, wherein the device is programmed to effectuate the communications channel when a combination of the navigation buttons and the user input devices are depressed simultaneously.

19. A handheld computer, comprising:
   a processor;
   a display including a touch screen coupled to the processor;
   a plurality of user input keys coupled to the processor;
   a wireless telephony device coupled to the processor; and
   an operating system running on the processor;
   whereby the operating system is configured to call an emergency service when two or more user input keys are pressed simultaneously,
   wherein the device is configured to effectuate the communications channel to the emergency service when the state of any software operating on the device is in a non-communications mode, and is further configured to effectuate the communications channel to the emergency service when the state of any software operating on the device is in a communications mode.

20. The handheld computer of claim 19, wherein the handheld computer does not include a mechanical telephone keypad.

21. The handheld computer of claim 19, wherein the emergency service is called when four input keys are depressed simultaneously.

22. The handheld computer of claim 21, wherein the input keys must be depressed simultaneously for at least one second.

* * * * *